United States Patent [19]
Holmquist

[11] Patent Number: 6,108,347
[45] Date of Patent: Aug. 22, 2000

[54] NON-POLLED DYNAMIC SLOT TIME ALLOCATION PROTOCOL

[75] Inventor: Kurt E. Holmquist, Largo, Fla.

[73] Assignee: Paradyne Corporation, Largo, Fla.

[21] Appl. No.: 08/947,279

[22] Filed: Oct. 8, 1997

Related U.S. Application Data

[60] Provisional application No. 60/038,321, Feb. 26, 1997.

[51] Int. Cl.[7] .............................. H04B 7/212; H04L 12/43
[52] U.S. Cl. ............................ 370/458; 370/442; 370/443
[58] Field of Search .................................... 370/280, 252, 370/330, 347, 349, 442, 460, 458, 514, 352, 443, 444, 438, 439, 440, 462

[56] References Cited

U.S. PATENT DOCUMENTS

| | | | |
|---|---|---|---|
| 5,402,422 | 3/1995 | Liu et al. | 370/443 |
| 5,570,355 | 10/1996 | Dail et al. | 370/352 |
| 5,648,958 | 7/1997 | Counterman | 370/458 |
| 5,936,960 | 8/1999 | Stewart | 370/438 |

*Primary Examiner*—Chi H. Pham
*Assistant Examiner*—Brenda H. Pham
*Attorney, Agent, or Firm*—Thomas, Kayden, Horstemeyer & Risley, L.L.P.

[57] ABSTRACT

A protocol allows a device connected to a common channel to communicate directly with another device on that channel during a predetermined slot time. The protocol is particularly suited to a communications network where all communications devices are able to communicate directly with each other. In architecture, the protocol can be implemented in hardware, software or a combination thereof, and is more particularly implemented as follows. A central communications device for processing slot time sequence information and communicating it to tributary communications devices is connected via any number of communications channels to a plurality of tributary communications devices. The configuration of the system is such that the communications devices can directly transmit and receive information from each other. The central communications device optimizes system bandwidth usage by dynamically allocating a sequence of slot times for use in the protocol. The communication devices then communicate with each other during their assigned slot times under the control of the protocol.

19 Claims, 6 Drawing Sheets

NON-POLLED DYNAMIC SLOT TIME ALLOCATION PROTOCOL

This document claims priority to and the benefit of the filing date of U.S. provisional application entitled "Non-Polled Party Line Multipoint Protocol", filed Feb. 26, 1997 and accorded Ser. No. 60/038,321 (Attorney Docket No. 61605-8250).

FIELD OF THE INVENTION

This invention generally relates to a protocol for managing the use of a common circuit by multiple communications devices without using conventional polling.

BACKGROUND OF THE INVENTION

Multipoint communication techniques used over voice-band phone lines have traditionally relied on a central communications device to manage the use of the line. Communication generally takes place only between the central communications device and all other tributary communications devices. Tributary devices do not communicate directly with each other. The central communications device is connected via a communications channel to every tributary communications device. The central communications device transmits in broadcast fashion to all tributary devices and controls access to the communications channel by one tributary device at a time using polling. There is no contention for transmit access to the shared circuit by the tributaries because access is explicitly granted by the central communications device.

Numerous protocols have been developed to implement this form of polled communications. However, these protocols have the disadvantage of polling overhead. Giving a single tributary device an opportunity to transmit requires polling that device over the communications channel even if the device has nothing to send. The central communications device polls a tributary device by sending a signal to the tributary device to determine if it has data to send. The tributary device then responds to the central communications device by sending a signal over the same communications channel that reveals if the tributary device has data to transmit. This process is performed regardless of whether or not the tributary device has data to send. Consequently, the time used for polling reduces the time available for the transmission of information. Additionally, this polling process has significant overhead in training, timing synchronization, etc. which reduces the total bandwidth or transmission capacity available for the actual information being transmitted.

A number of protocols have been developed for contention access to a common circuit. They are typically intended to allow any communications device to communicate with any other communications device. In these protocols, typically there is no guarantee that only a single device will attempt to transmit at a given time. Therefore, provisions are made to detect simultaneous transmissions and take corrective action when two devices attempt to transmit at the same time over the same channel (also known as a "collision"). In contention access protocols, the frequency of collisions and the overhead associated with collision detection and recovery generally result in significant losses of available bandwidth. Again, the time used to execute these collision detection and recovery techniques reduces the time available for the transmission of information.

Finally, the overhead and complexity of polling can be avoided by using loop protocols operating on specially designed loop circuits. In a loop circuit, the central communications device and all tributary communications devices are connected sequentially in a loop configuration. In this circuit, each device is connected directly to two other devices via a single communications channel that passes through each device. Loop protocols require that the communications channel passes through each communications device so that the device can modify the signal it has received before the signal is transmitted to any other device. Under a loop protocol, communications devices can communicate directly with each other. Usually, data transmitted by one device contains the address of the receiving device. The information is then transmitted to the next device on the loop circuit. This next device looks at the information to see if it is the intended recipient. If it is, the device receives the data. If it is not, the device transmits the data to the next device. This process continues until the intended device receives the transmission. Loop protocols typically circulate a special message called a token. When a station receives the token, it can transmit its own messages (if it has messages to send) in addition to just repeating the transmission received from the previous station in the loop. The token is not transmitted to the next station until the current station is finished transmitting. Loop protocols eliminate the overhead associated with traditional polling and contention access protocols but require the construction of a loop circuit. The added expense of this construction makes a loop circuit less desirable. Loop protocols have the important additional shortcoming that all stations must be given identical access to the shared resource of the circuit bandwidth since the token arrives at each station exactly one time as it makes its way around the loop. It is not practical to allow some stations to use a greater portion of the available bandwidth than others. It may be desirable to allocate more bandwidth to some stations which are supporting applications which require this.

SUMMARY OF THE INVENTION

The present invention overcomes the shortcomings of the prior art by providing a protocol that allows any device connected to a common channel to selectively communicate with any other device on that channel during a predetermined slot time. Although not limited to this particular application, the present invention is particularly suited to a communications network where all communications devices are able to communicate directly with each other.

In architecture, the protocol system is generally implemented as follows. A central communications device including a controller for processing slot time sequence information and communicating it to tributary communications devices is connected via a plurality of communications channels to a plurality of tributary communications devices. The network of communications devices is configured so that they can communicate directly with each other. Every station can receive the transmission of every other station. This ability is easily achieved with "bus" structures such as found with many common LAN wiring schemes (e.g., Ethernet) or with a phone line to which multiple parties are connected. The central communications device allocates slot times dynamically to continually optimize bandwidth usage. The term "time" in "time slots" is used only to imply that specific slots are identified based on their ordering within a time based sequence. As used in relation to discussion of this invention, a time slot's length is never fixed but rather varies according to the needs of a station to transmit data within the limits of its assigned time slot. Access to a single shared communications device is controlled with less overhead than traditional contention access protocols and without the costly construction of a loop circuit.

More specifically, in the present invention, the central communications device establishes a sequence of slot times based on an initial priority. Each slot time is a period during which a communications device may transmit information. The central communications device informs each tributary communications device of the current sequence. All communications devices track each transmission to determine the current slot in the sequence and their place in the sequence. If a communications device has something to send, it transmits during its assigned slot time up to a predefined maximum time period. If it has nothing to send, it remains silent, which silence is interpreted by all other communications devices as a minimum length transmission. As soon as one communications device finishes using its slot time, the communications device assigned to the next slot time either begins its transmission or remains silent if it has nothing to send. In one embodiment, the central communications device monitors bandwidth usage by tributary communications devices, compares bandwidth usage to available system bandwidth, and reallocates slot times dynamically to optimize bandwidth usage. In another embodiment, the central communications device initially determines, continuously revises, and dynamically allocates slot times. The central communications device sends slot time information to the tributary communications devices and controls communication among them. In accordance with this invention, slot times are dynamically allocated, and the most efficient bandwidth utilization is achieved by the continuous optimization and reallocation of slot times. In this dynamic allocation process, the central communications device monitors and collects information about bandwidth utilization by tributary devices which it uses to optimize system bandwidth usage by readjusting and reallocating slot times.

A plurality of slot time sequences and lengths can be utilized. Each slot time has a common minimum time length, but can have a variable maximum length. A complex slot time sequence and variable slot time duration can be used to provide some communications devices with more transmission time than others. An unlimited number of sequences may be formulated for use with the present invention.

The invention has numerous advantages, a few which are delineated, hereafter, as merely examples.

An advantage of the present invention is that it overcomes the problems and deficiencies of the prior art.

Another advantage of the present invention is that it provides an effective, low overhead protocol that results in more efficient utilization of the available bandwidth than currently existing protocols.

Another advantage of the present invention is that it provides a method for the reliable transmission of signals over a common channel without polling or collision avoidance measures.

Another advantage of the present invention is that it provides a method and apparatus for allowing any device connected to a common channel to communicate with any other device on that channel.

Another advantage of the present invention is that it provides a protocol that can effectively and efficiently be used on a telephone line and its connected devices.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

The present invention, as described in the claims, can be better understood with reference to the following drawings. The components in the drawings are not necessarily to physical scale, emphasis instead being placed upon clearly illustrating principles of the present invention.

DETAILED DESCRIPTION OF THE PREFERRED EMBODIMENT

A. Architecture of the Preferred Embodiment

Figure 1:
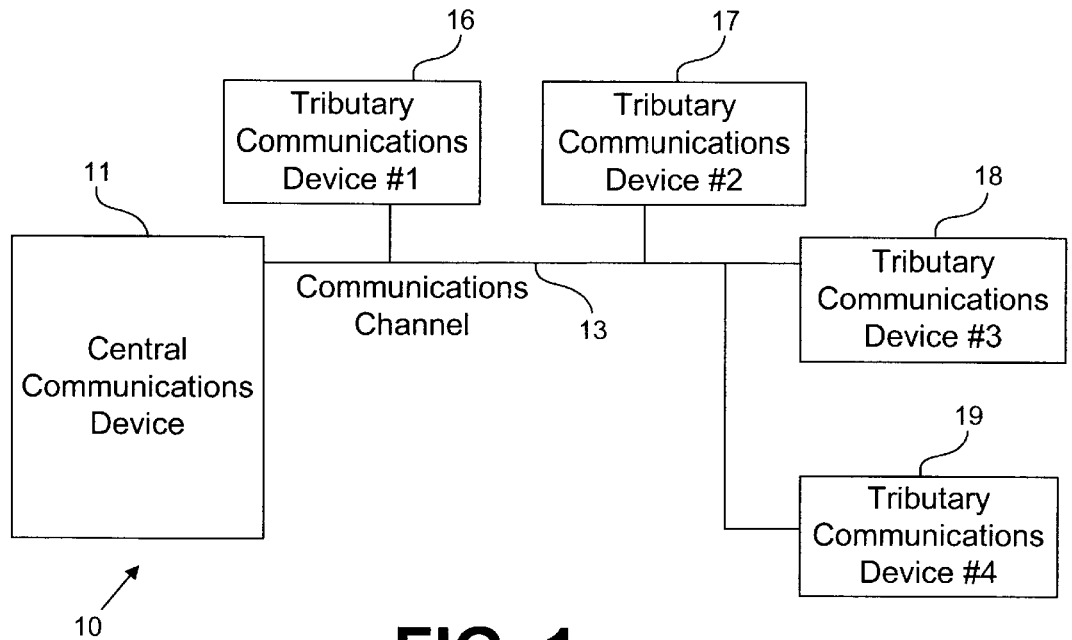
FIG. 1 is a block diagram of a communications network having N tributary communications devices connected via a communications channel to a central communications device capable of employing the protocol of the present invention.
Figure 2:
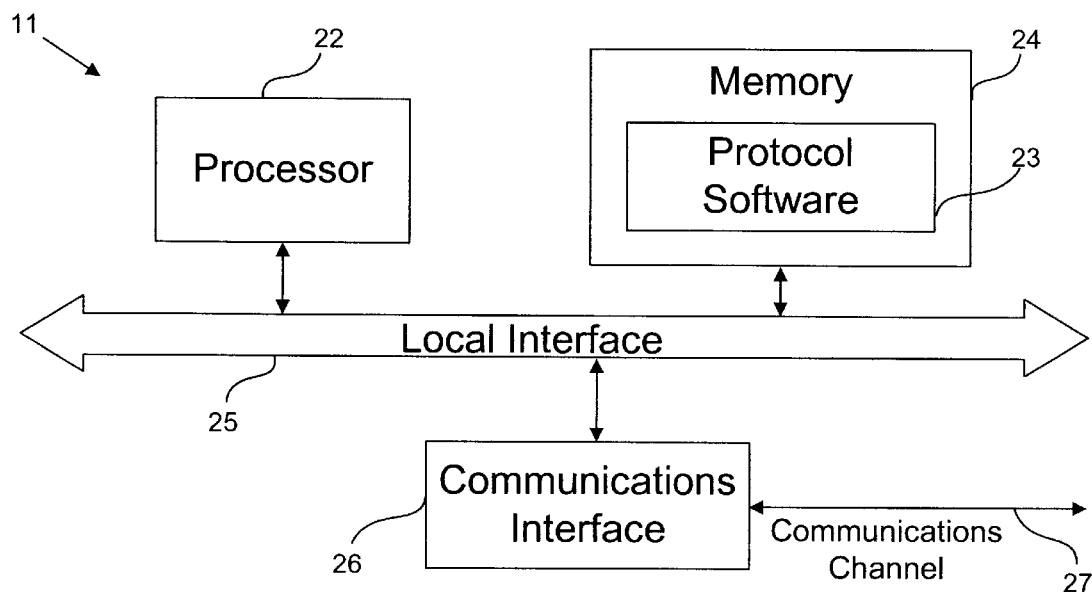
FIG. 2 is a block diagram of one embodiment of the central communications device of FIG. 1.

Turning to the drawings, a preferred embodiment of the invention will now be described with reference to FIGS. 1 and 2. In general, FIG. 1 is a diagram of a network 10 employing a protocol of the invention having a central communications device 11 connected via a first communications channel 13 to a plurality of tributary communications devices 16, 17, 18, and 19. FIG. 2 depicts an embodiment of the central communications device 11 having a processor 22 and protocol software 23 residing in memory 24 connected via a local interface 25 to a communications interface 26, which is connected to a communications channel 27.

As shown in FIG. 1, the central communications device 11 communicates with each of the tributary communications devices 16, 17, 18 and 19 via channel 13. In the same way, each of these tributary communications devices 16, 17, 18, and 19 can communicate with each other and the central communications device 11 via channel 13. Communications channel 13 carries the signals among the devices. Inasmuch as the tributary communications devices and the central communications device may or may not actually communicate information intended for one another, the "communication" among the various devices may also be described as the ability to monitor one anothers' transmissions. For example, a communications device may only communicate information between itself and the central communication device. Alternatively, the central communication device may serve simply as a means for forwarding messages from the communications devices to remote destinations. Regardless of the logical relationship among the devices, each device must be able to monitor transmissions on communications channel 13 to execute the protocol. One of many possible realizations of communications channel 13 is a telephone line in a residence where a single wire pair connects all communications devices with the central office. Another realization is a single segment of a shared local area network (LAN) cable such as is frequently used with standard LAN protocols such as Ethernet. The entire network 10 can contain one or more central communications devices 11, one or more tributary communications devices 16, 17, 18, 19, and one or more communications channels 13.

Each of the tributary communications devices 16, 17, 18 and 19 can be implemented in numerous ways including, but not limited to, a telephone, a data handling system, a computer system with a modem or any other device capable of transmitting and receiving information. The central communications device 11 and the tributary communications devices 16, 17, 18 and 19 in the network 10 are implemented to transmit and receive information in half duplex.

One possible embodiment of the central communications device 11 is shown in FIG. 2. The processor 22 is configured to execute the protocol software 23 which performs the steps of the protocol process. The protocol software can include numerous methods for initially allocating slot times, assigning and reassigning slot times, calculating an optimal slot time for each tributary communications device, optimizing bandwidth usage, monitoring slot time and bandwidth usage, performing timing functions, communicating slot time information and/or facilitating communication among devices. In this embodiment, the protocol software 23 is stored in the memory 24. The memory 24 can be implemented in numerous ways including, but not limited to, RAM, ROM, or any other memory device. The method chosen for any given system embodiment will preferably be selected to maximize the bandwidth utilization for that embodiment. The local interface 25 (e.g. one or more buses) connects the processor 22 and the memory 23 to the communications interface 26. The communications interface 26 is connected to the communications channel 27. The communications channel 27 can be implemented in many ways including, but not limited to, a telephone line. The communications interface 26 allows the transmission of signals to and from the processor 22 and memory 24. The communications interface 26 also performs any translation functions necessary for the proper operation of the network 10 employing a protocol of the invention. For example, the communications interface 26 can transform signals generated by the processor 22 into a form that is understood by the tributary communications devices 16, 17, 18 and 19. Similarly, the communications interface 26 can transform signals generated by the tributary communications devices 16, 17, 18 and 19 into a form that is understood by the processor 22. The communications interface 26 can be implemented in numerous ways including, but not limited to, a modem.

B. Operation of the Preferred Embodiment

Figure 3A:
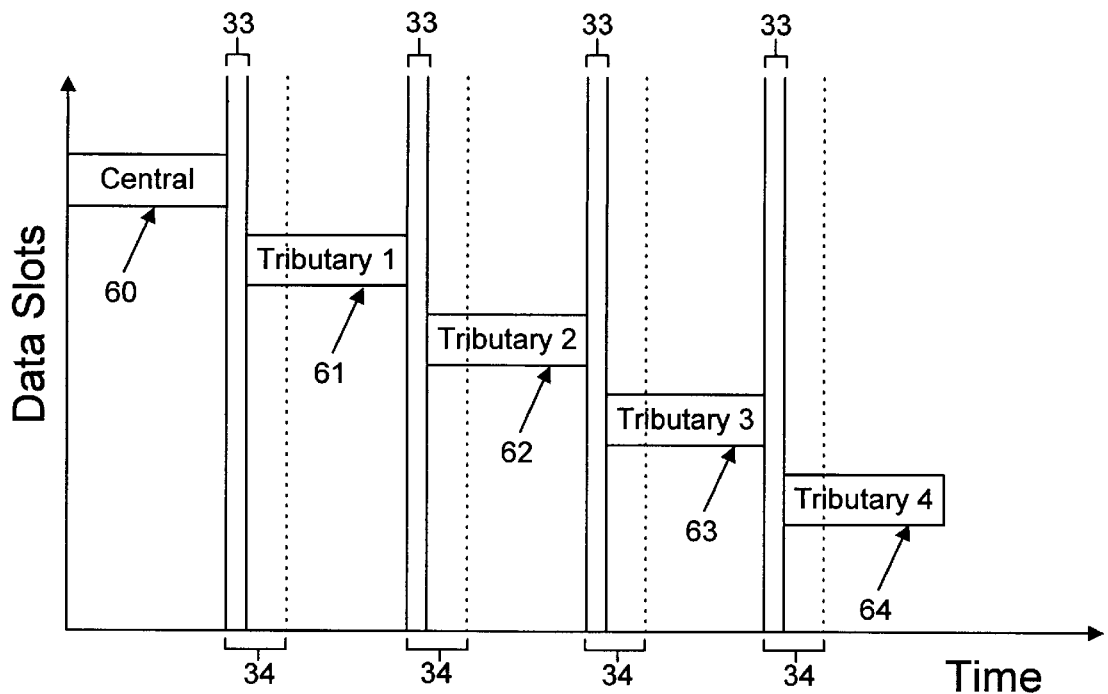
FIG. 3A is an illustration of a transmission sequence among the central communications device and four tributary communications devices in the network of FIG. 1.
Figure 3B:
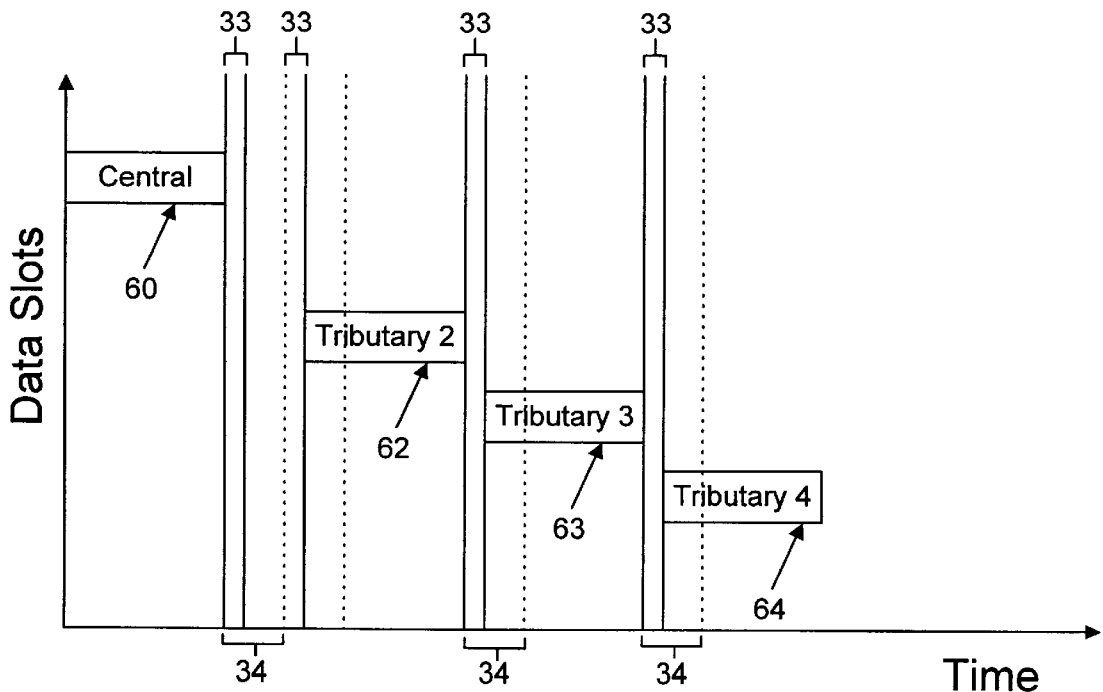
FIG. 3B is an illustration of the transmission sequence of FIG. 3A, except that one of the tributary communications devices has nothing to transmit.

The operation of the preferred embodiment of the network 10 employing a protocol of the invention is illustrated with reference to FIGS. 3A and 3B. FIGS. 3A and 3B are diagrams that generally portray a slot time sequence among a central communications device 11 and four tributary communications devices 16, 17, 18, and 19 (see FIGS. 5A and 5B). FIGS. 3A and 3B provide an example of the communications steps in the protocol.

With reference to FIG. 3A, the central communications device 11 utilizes the first slot time 60 to communicate information about the sequence and duration of slot times to the tributary communications devices 16, 17, 18 and 19 via communications channel 13. Other information (e.g. data as opposed to timing and control signals) can also be transmitted by the central communications device 11 to any or all other tributary communications devices 16, 17, 18 and 19 during this first slot time 60. A predefined time 33 then passes before the next tributary station 16 can begin transmission. This assigned time 33 can be a setup time or a delay time to allow the next communications device to prepare for sending or receiving signals. It is important to note that time intervals 33 or 34 begin either with the end of transmission in the preceding slot or with the expiration of interval 34 from the preceding slot in the event the device assigned this slot elects not to transmit. All devices can use the end of transmission as a common reference since all devices can receive the transmission from any other (regardless of which station is the intended recipient). The next tributary communications device 16 then begins transmission during slot time 61, followed by another delay time 33, then another tributary communications device 17 and so on, until the sequence is complete.

Figure 3C:
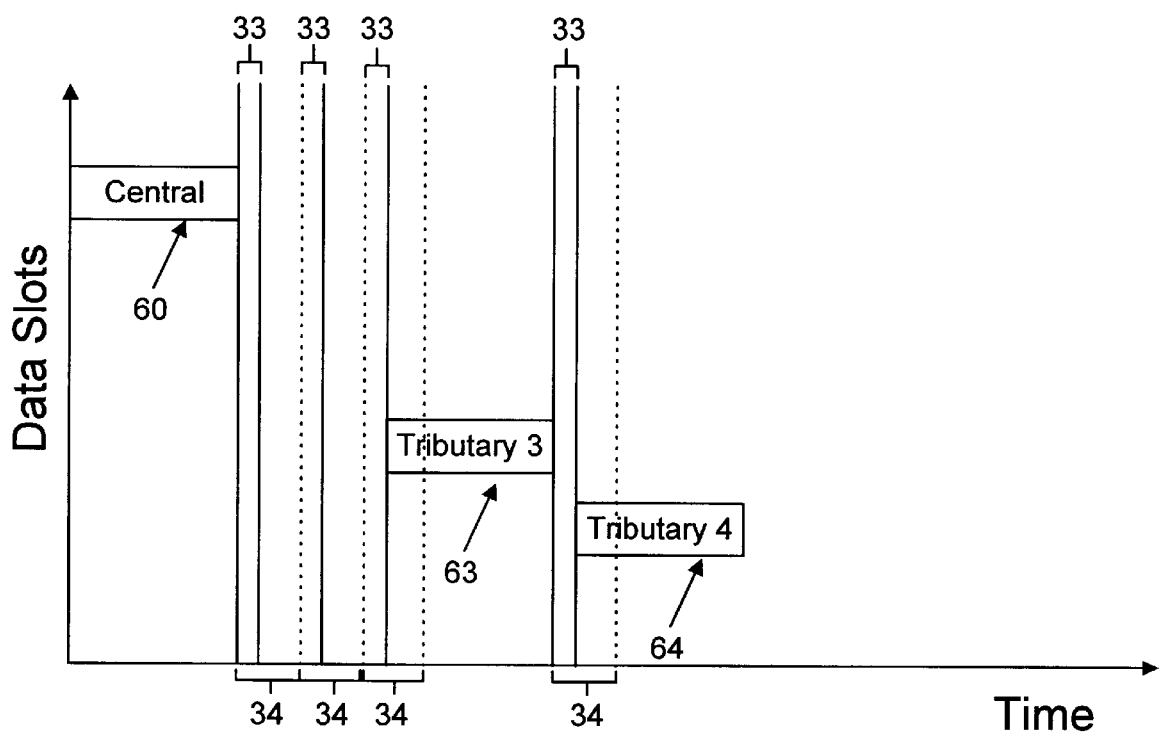
FIG. 3C is an illustration of the transmission sequence of FIG. 3A, except that two of the tributary communications devices have nothing to transmit.

For the purpose of clarity in understanding the invention, FIGS. 3B and 3C illustrate a variation of the sequence of FIG. 3A. In FIG. 3B, the same sequence is executed with the exception that the first tributary communications device 16 has nothing to transmit. The central communications device 11 transmits information about the sequence and duration of slot times along with, possibly, other information to all the tributary stations 16, 17, 18 and 19 via communications channel 13. The delay time 33 then passes before the first tributary communications device 16 may transmit during its assigned slot time. One feature of the present invention that provides enhanced bandwidth utilization relates to the dynamic allocation of slot times during which communication devices can transmit information. In accordance with this feature, when a given tributary device has nothing to transmit, its assigned slot time is dynamically shortened. In this regard, a tributary device must begin its transmission within a predefined time period 34, following the immediately preceding transmission slot time. Returning to the illustration of FIG. 3B, since the first tributary communications device 16 has nothing to transmit, all other communications devices wait the preassigned time 34 before the next tributary communications device 17 readies itself for transmission. The delay time 33 (following time period 34) then passes and the next tributary communications device 17 begins its transmission. The sequence previously described in FIG. 3A then continues. The wait time 34 can be of any practical duration. Similarly, FIG. 3C illustrates the sequence in which both first and second tributary communications devices 16 and 17 have nothing to transmit.

Silence detection can be used by the central communications device 11 to determine if the tributary communications device is transmitting during its assigned slot time. Since slot times do not have fixed lengths and silence implies that a communications device has nothing to send, the minimum slot time duration or wait time 34 can be as small as the ring down time of the circuit plus the time needed to reliably detect silence at the communications device. This insures that a minimum amount of time elapses between transmissions. Furthermore, as is shown in FIG. 3B, the wait time 34 can include the delay time 33 for the non-transmitting communications device.

These slot times 60, 61, 62, 63, 64 can be of any practical duration and are shown as being the same duration in FIGS. 3A and 3B simply for illustrative purposes. Each station uses only as much time as it needs to send a message up to the maximum slot time assigned by the central station. When a station sends a very short message, the time remaining in its assigned time slot is not used by this station. This allows the corresponding portion of the circuit data transmission capacity to become available for use by other stations. Of course, depending upon the system configuration, variable slot time lengths may be used to provide some communications devices with more transmission time than others. These variable slot times are continuously revised during the dynamic allocation process. This reduces latencies for the communications devices which are allowed more transmission time and promotes the efficient use of total available bandwidth. Additionally, a lengthy maximum slot time duration can be used to allow each device to complete its transmission during one slot time. A fixed maximum slot time duration can also be used.

The end of a transmission by a station can be recognized by other stations either by detection of silence on the line during time interval 33 in FIGS. 3A and 3B or by reception of a unique code sent immediately after the message data which is reserved to indicate the end of a message (e.g., the HDLC "flag" code). As an alternative to using a silence interval, each station can send a short "no data" message when it has nothing to send. In a manner known in the art, the message header structure can also be designed to include the address of the sender and possibly an identifier of the current slot time in the sequence. This can aid other communications devices in confirming synchronization with the current sequence and recovering from a loss of synchronization.

Figure 4:
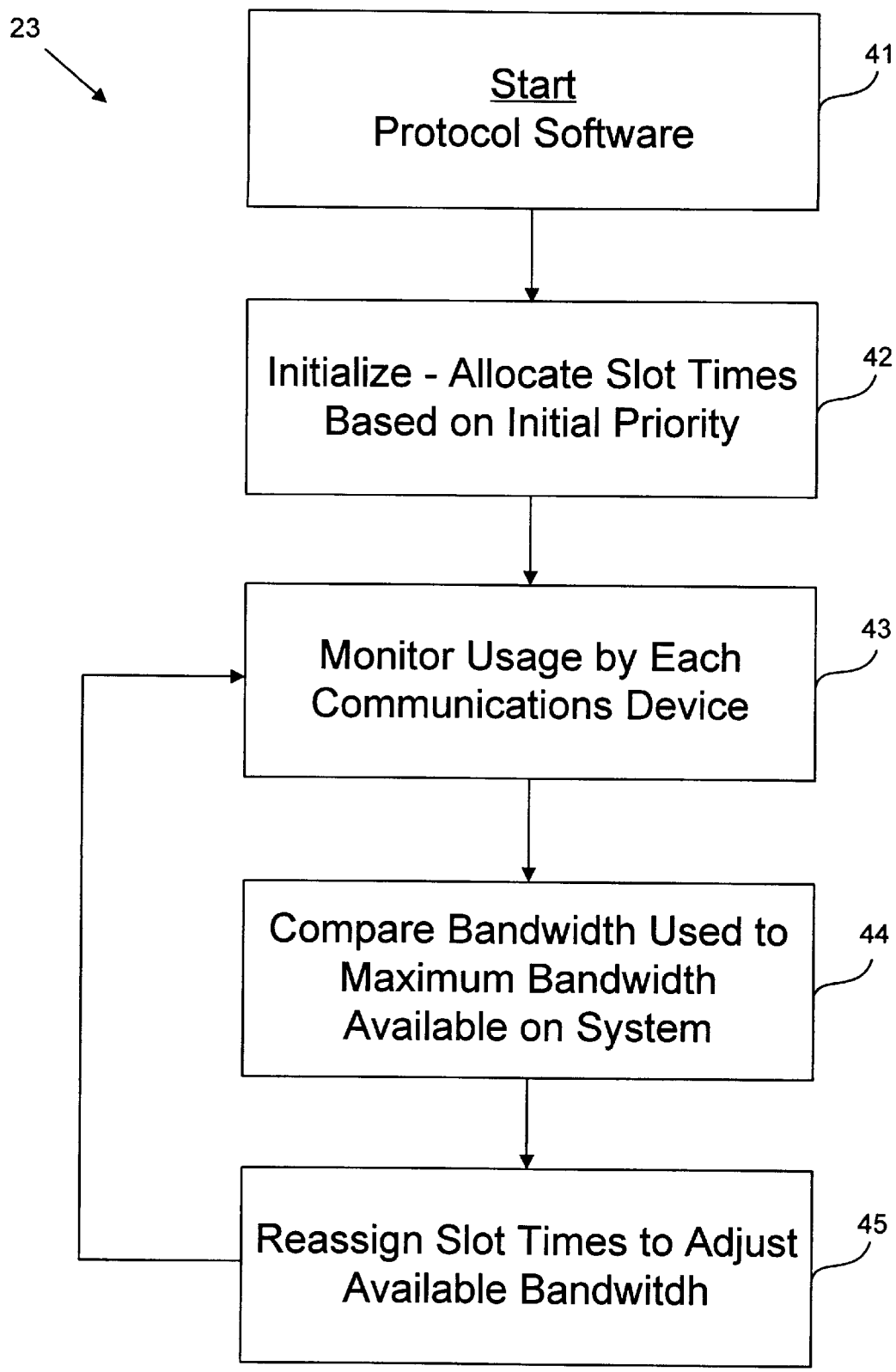
FIG. 4 is a top level flow chart of a protocol algorithm for the protocol software of FIG. 2.

FIG. 4 depicts one possible combination of steps that may be implemented in the protocol software 23. The protocol software 23 is initiated, for example, by the processor 22 in the first step 41 of the protocol. An initialization of slot time duration and sequence performed by, for example, the processor 22 then occurs in step 42. This initialization process can incorporate data from a previous system operation that is stored in, for example, the memory 24 to determine the initial slot time duration and sequence, perhaps using an optimization algorithm. The central communications device 11 monitors the usage of the communications channel 13 by the tributary communications devices 16, 17, 18 and 19 in the next step 43. This monitoring step 43 can include the acquisition and storage of information about transmission lengths and bandwidth usage. This information can be used in the comparison step 44 and the reassignment step 45. In the comparison step 44, the processor 22, for example, determines the bandwidth used by each of the tributary communications devices 16, 17, 18 and 19 and compares that usage to the total bandwidth available on the system. This information is then used in the reassignment step 45. In this step 45, the processor 22, for example, uses the information about slot time and bandwidth usage to reallocate the total available bandwidth to each tributary communications device 16, 17, 18 and 19. This reallocation can involve giving some devices more slots in the sequence or the use of a longer slot time duration. The processor 22 then returns to step 43 to continually monitor and refine the allocation of bandwidth in the network. This continual monitoring and reassignment of slot times results in the optimal allocation of bandwidth and the most efficient use of the total system resources.

The protocol algorithm of FIG. 4 can be implemented in hardware, software, or a combination thereof When implemented in software, the protocol algorithm can be stored, transported, and/or utilized while residing on any computer readable medium for use by or in connection with any suitable computer based system. In the context of this document, a computer readable medium may be electronic, magnetic, optical, or other physical device or means that can contain or store a computer program for use by or in connection with a computer based system.

Figure 5A:
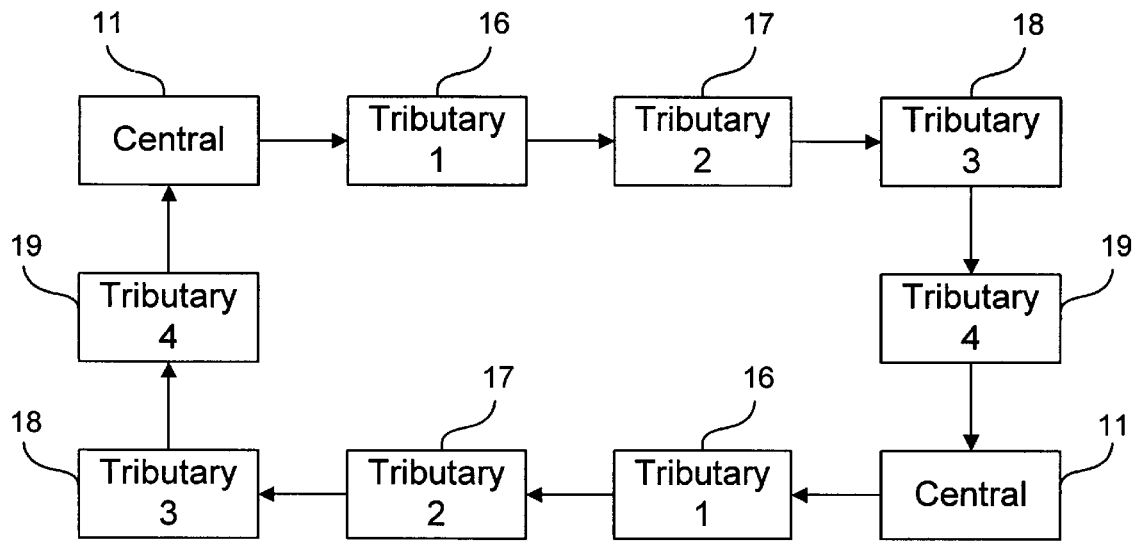
FIG. 5A is a block diagram of one possible sequence of slot times for the devices of FIG. 1.
Figure 5B:
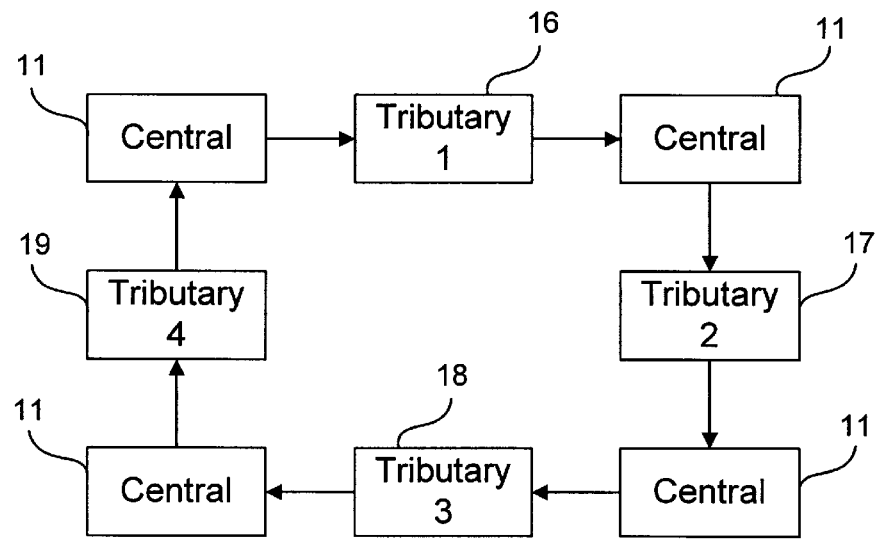
FIG. 5B is a block diagram of another possible sequence of slot times for the devices of FIG. 1.

Virtually any sequence of slot times containing any practical duration of slot times can be implemented by the present invention. FIGS. 5A and 5B depict two possible sequences. The actual assigned maximum duration of each slot time can vary from one station to another station. In FIG. 5A, a simple sequence of slot times begins with the central communications device 11, followed by the first tributary communications device 16, followed by the second tributary communications device 17, followed by the third tributary communications device 18, and followed by the fourth tributary communications device 19. The foregoing sequence then repeats. In FIG. 5B, the sequence begins with the central communications device 11 and then alternates between tributary communications devices 16, 17, 18 and 19 and the central communications device 11.

A more complex slot time sequence can be used to provide some communications devices with more transmission time than others. This reduces latencies for the communications devices which are given more slot times and allows more efficient use of total available bandwidth. If the maximum time any one communications device can transmit within a slot time is limited, then the asymmetric allocation of slots also provides a way to asymmetrically allocate bandwidth. For example, two stations needing to communicate with each other and having requirements for low latency but low average data rate could be assigned multiple time slots each with very short maximum durations. Longer sequences can be used to increase the potential asymmetry in latencies or bandwidths. An unlimited number of sequences may be formulated for use with the present invention.

Figure 6:
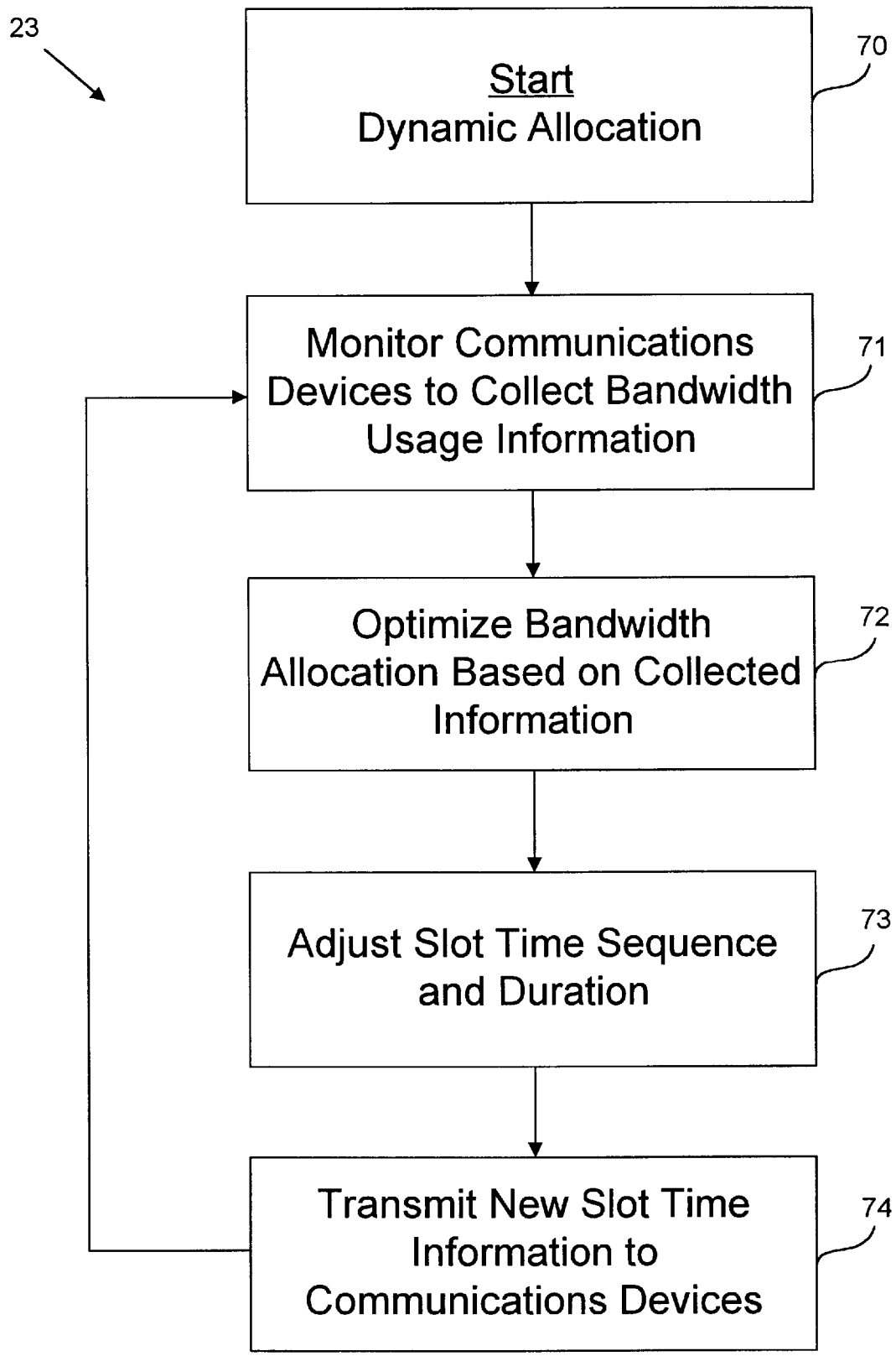
FIG. 6 is a flow chart depicting an algorithm for dynamic allocation of slot times for the protocol software of FIG. 2.

FIG. 6 depicts one possible combination of steps for the dynamic allocation of slot times contained in the protocol software 23. The protocol software 23 is initiated, for example, by the processor 22 in the first step 70 of the dynamic allocation process. This initialization process can incorporate data from a previous system operation that is stored in, for example, the memory 24. The central communications device 11 monitors the usage of the communications channel 13 by the tributary communications devices 16, 17, 18 and 19 in the next step 71. This monitoring step 71 can include the acquisition and storage of information about transmission lengths and bandwidth usage. This information is used in step 72 to optimize the bandwidth allocation. In step 72, the processor 22, for example, utilizes one or more optimization techniques to determine the most efficient allocation of available system bandwidth. This optimization step 72 can be implemented one or more times during each sequence of slot times. Based on the results of the optimization step 72, the processor 22, for example, adjusts the slot time duration and sequence in step 73. In this adjustment step 73, the duration of each slot time and the sequence of slot times may or may not be altered. Additionally, different combinations of slot time sequences and duration may be used to achieve the same optimal use of bandwidth. For example, a shorter sequence of slot times with a longer duration may achieve the same effect as a longer sequence of slot times with a shorter duration. Additionally, different sequences of slot times may also produce the same optimal result. The adjustment performed in step 73 can include adjusting the slot time sequence, adjusting slot time duration, or both. After this adjustment step 73 is performed, the new slot time information is retained by the central communications device 11 and perhaps stored in memory 24 for use in a subsequent optimization calculation (step 72). The slot time information is transmitted to tributary communications devices 16, 17, 18 and 19 via communications channel 13 in step 74. The processor 22 then returns to step 71 to continually monitor and refine the allocation of bandwidth in the network. This dynamic allocation process results in the most efficient use of system resources.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims:

Now, therefore, the following is claimed:

1. A protocol method for permitting multiple devices to communicate along a common channel during preselected slot times, comprising the steps of:

determining, revising and allocating slot times;

communicating said slot times to communications devices;

controlling communications among said communications devices, each of said communications devices being configured to monitor communications from others of said communications devices; and allowing a specific one of said communications devices to transmit prior to its allocated one of said slot times after said specific one of said communications devices monitors that another one of said communications devices has completed transmitting.

2. The method of claim 1, wherein said slot times are separated by a predetermined delay interval.

3. The method of claim 1, wherein the step of determining, revising and allocating slot times includes the dynamic allocation of slot times.

4. The method of claim 1, wherein the step of determining, revising and allocating slot times further comprises the step of optimizing the allocation of said slot times.

5. The method of claim 1, further comprising the step of determining a variable length of time for each slot time.

6. The method of claim 1, further comprising the step of determining alternative slot time sequences for use in the protocol.

7. The method of claim 1, wherein the step of allowing includes detecting silence from said communications devices to determine that another of said communications devices is not using at least a portion of a slot time that it has been allocated.

8. The method of claim 1, wherein the step of determining, revising and allocating slot times further comprises the step of detecting silence from said controller to determine that said controller is not using a slot time that it has been allocated.

9. The method of claim 1, further comprising the step of defining a wait time between slot times.

10. The method of claim 1, further comprising the step of defining a minimum length transmission time.

11. A computer readable medium having a program for permitting multiple devices to communicate along a common channel during preselected slot times, said program comprising:

logic configured to determine, revise and allocate slot times;

logic configured to communicate said slot times to communications devices;

logic configured to control communications among said communications devices; and logic configured to allow a specific one of said communications devices to transmit prior to its allocated one of said slot times after said specific one of said communications devices monitors that another one of said communications devices has completed transmitting.

12. A computer readable medium having a program for permitting multiple devices to communicate along a common channel during preselected slot times, said program comprising:

logic configured to allocate slot times based on an initial priority;

logic configured to communicate slot time information to communications devices;

logic configured to monitor channel usage and transmissions from said communications devices;

logic configured to compare the bandwidth used by said communications devices to the maximum bandwidth available on said communications channel;

logic configured to reassign slot times to adjust available bandwidth; and logic configured to allow a specific one of said communications devices to transmit prior to its allocated one of said slot times after said specific one of said communications devices monitors that another one of said communications devices has completed transmitting.

13. A computer readable medium having a program for permitting multiple devices to communicate along a common channel during dynamically allocated slot times, said program comprising:

logic configured to monitor communications devices to collect bandwidth usage information;

logic configured to optimize bandwidth allocation based on said bandwidth usage information;

logic configured to adjust slot time sequence and duration;

logic configured to transmit adjusted slot time sequence and duration to said communications devices; and logic configured to allow a specific one of said communications devices to transmit prior to its allocated one of said slot times after said specific one of said communications devices monitors that another one of said communications devices has completed transmitting.

14. A computer readable medium having a program for permitting multiple devices to communicate along a common channel during preselected slot times, said program comprising:

logic configured to determine a sequence for said slot times;

logic configured to track the transitions in said sequence of said slot times by monitoring transmissions from a plurality of communications devices;

logic configured to determine whether a specific slot time is assigned to a specific communications device;

logic configured to transmit information from said specific communications device during said specific slot time if said specific slot time is assigned to said specific communications device, said specific slot time having a maximum slot time length allocated by a central communications device; and logic configured to allow said specific communications device to transmit prior to said specific slot time after said specific communications device monitors that another one of said communications devices has completed transmitting.

15. A system for permitting communications along a common channel utilizing slot times, comprising:

first and second communications devices;

a third communications device configured to allocate a sequence of slot times and to communicate said slot times to said first and second communications devices, said third communications device allocating a first slot time of said sequence to said first communications device, and allocating a second slot time of said sequence to said second communications device, said second slot time being present in said sequence after said first slot time; and a communications channel connected to said first, second, and third communications devices such that each of said communications devices can communicate directly with each other;

said second communications device being configured to detect an end of a transmission of said first communications device such that, during said first slot time, said second communications device is adapted to initiate said second slot time in response to detecting said end of said transmission of said first communications device.

16. The system of claim 15, wherein said communications channel is a telephone line.

17. The system of claim 15, wherein said communications devices include means for recognizing an end of a transmission.

18. The system of claim 15, wherein said end of said transmission of said first communications device is indicated by a silence of said first communications device.

19. The system of claim 15, wherein said end of said transmission of said first communications device is indicated by a code transmitted from said first communications device.

* * * * *